Figure 1:
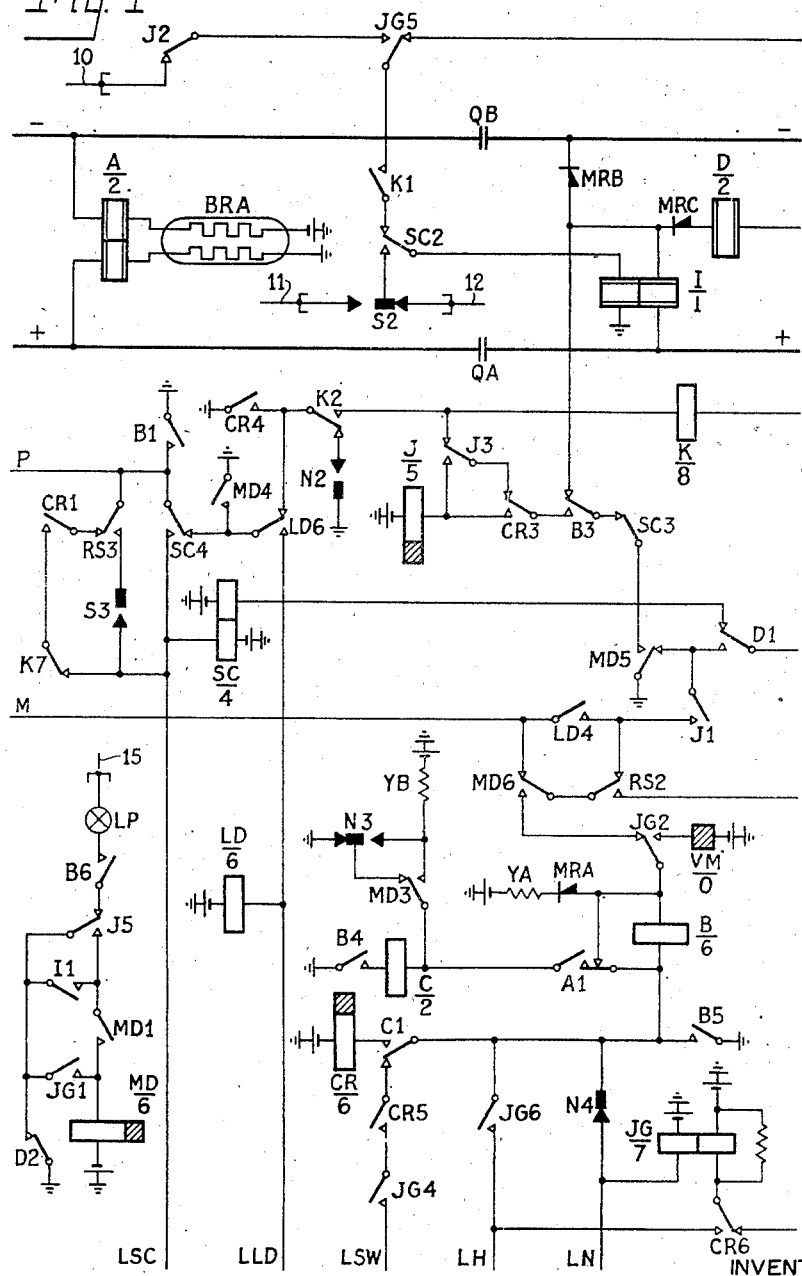

INVENTORS
REGINALD TAYLOR
GEORGE THOMAS BAKER

BY *Chas. Tu. Candy*
ATTORNEY

FIG. 6

| (0 - 9) | (70 - 79) | (710 - 719) |
|---|---|---|
| 0 - L | 0 - SC | 0 - SC |
| 1 - M | 1 - A | 1 - SC |
| 2 - M | 2 - L | 2 - SC |
| 3 - M | 3 - L | 3 - SC |
| 4 - M | 4 - M | 4 - L |
| 5 - M | 5 - M | 5 - L |
| 6 - M | 6 - SC | 6 - L |
| 7 - A | 7 - SC | 7 - L |
| 8 - MF | 8 - SC | 8 - SC |
| 9 - M | 9 - SC | 9 - SC |

FIG. 7

| | | | | | | |
|---|---|---|---|---|---|---|
| TT - | M | * | M | TA - | SC | L | SC |
| TU - | * | * | M | TB - | L | SC | SC |
| TV - | M | M | * | TC - | SC | SC | L |
| TW - | * | M | M | TD - | SC | SC | SC |
| TX - | M | * | * | TE - | MF | SC | SC |
| TY - | * | M | * | TF - | A | * | * |
| TZ - | * | * | * | TG - | * | A | * |
| | | | | TH - | | * | * |
| | | | | TJ - | * | | |
| | | | | TK - | | | * |

FIG. 8

| | | | | | |
|---|---|---|---|---|---|
| TX - | * | M | TA - | L | SC |
| TY - | M | * | TB - | SC | L |
| TZ - | * | * | TC - | SC | SC |
| | | | TD - | MF | SC |
| | | | TE - | A | * |

INVENTORS
REGINALD TAYLOR
GEORGE THOMAS BAKER

BY *[signature]*

ATTORNEY

Patented Jan. 4, 1949

2,457,946

UNITED STATES PATENT OFFICE 2,457,946

TOLL METERING BY DISCRIMINATING SELECTOR REPEATERS

Reginald Taylor and George Thomas Baker, Liverpool, England, assignors to Automatic Electric Laboratories Inc., Chicago, Ill., a corporation of Delaware Application December 11, 1944, Serial No. 567,552
In Great Britain February 16, 1944

9 Claims. (Cl. 179—9)

The present invention relates to telephone systems and automatic switches for use therein and is more particularly concerned with discriminating selector repeater (D. S. R.) switches for use at satellite exchanges in telephone exchange networks.

On such networks it is usually considered desirable that all calls for which registration against a calling party can be effected on either a single or a multi-fee basis shall be completed automatically and the present invention is chiefly concerned with the metering arrangements for such calls at satellite exchanges.

Two methods are disclosed in an article entitled "Multi-Fee Call Dialling and Registration" in the Post Office Electrical Engineers' Journal, Volume 31, page 5. According to one of these methods multi-fee metering equipments are provided which are accessible from satellite exchange D. S. R.'s of standard type over the wipers and banks of hunter switches, while in the other method combined multi-fee metering equipments and digit discriminating equipments are provided which are accessible from satellite exchange first numerical selectors over hunter switches, the D. S. R.'s thus being replaced by first selectors which are of slightly modified form to cater for impulse repetition to the main exchange. In both instances the satellite exchange multi-fee metering equipments are taken into use on every type of originated call regardless of whether a single or multi-fee meter registration will be required. Hence the number of metering equipments required to give the requisite grade of service is more than strictly necessary. The chief object of the invention is to provide a simple arrangement whereby greater economy in the use of multi-fee metering equipments is obtained without any appreciable complications in other directions.

According to one feature of the invention, in a telephone system including satellite exchanges equipped with discriminating selector repeaters over which local calls are completed after the absorption of one or more digits, impulse responding equipment associated with a discriminating selector repeater is arranged to control the taking into use of equipment for controlling multi-fee metering in such manner that a set of multi-fee metering equipment is only taken into use after the value of the impulses received has indicated that it will be needed.

According to another feature of the invention, in a telephone system including satellite exchanges equipped with discriminating selector repeaters over which local calls are completed after the absorption of one or more digits, equipment for controlling multi-fee metering is arranged to be accessible over the wipers of a discriminating selector repeater.

A further feature of the invention is that in a telephone system including satellite exchanges equipped with discriminating selector repeaters over which local calls are completed after the absorption of one or more digits, equipment arranged to control the operation of a discriminating selector repeater in accordance with the extent of its setting is arranged also to control the transmission of a distinctive signal to the calling party and the release of the partially set up connection if an unassigned number is dialled.

The invention will be better understood from the following description of one method of carrying it into effect, reference being had to the accompanying drawings comprising Figs. 1–8.

Figure 2:
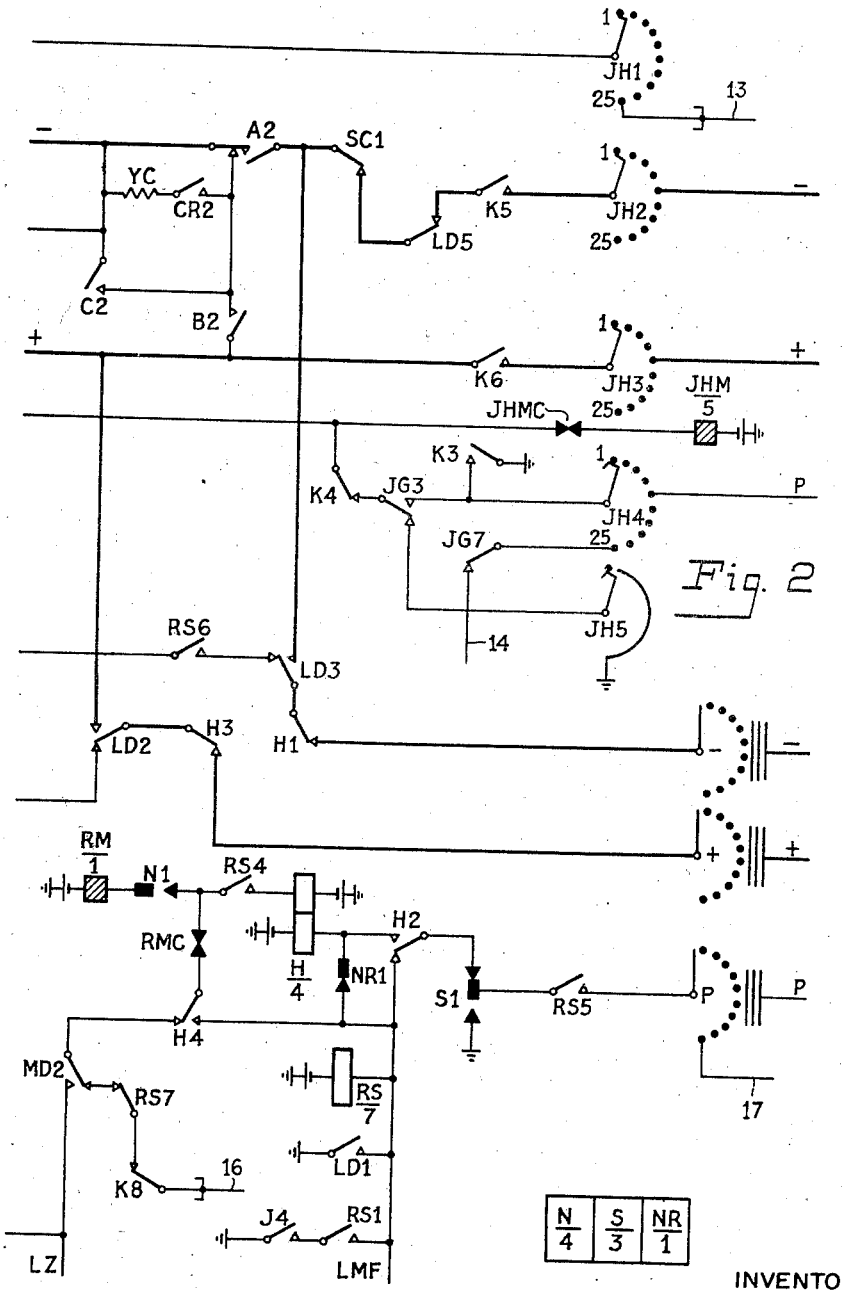
Figure 3:
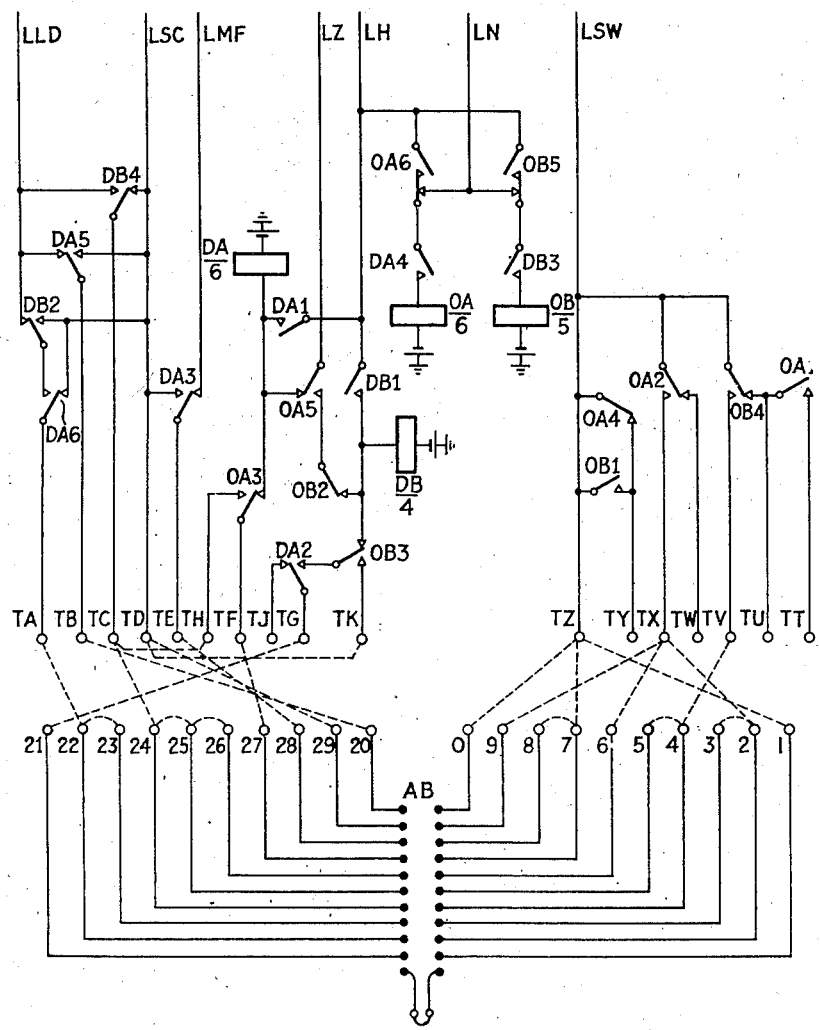
Figure 4:
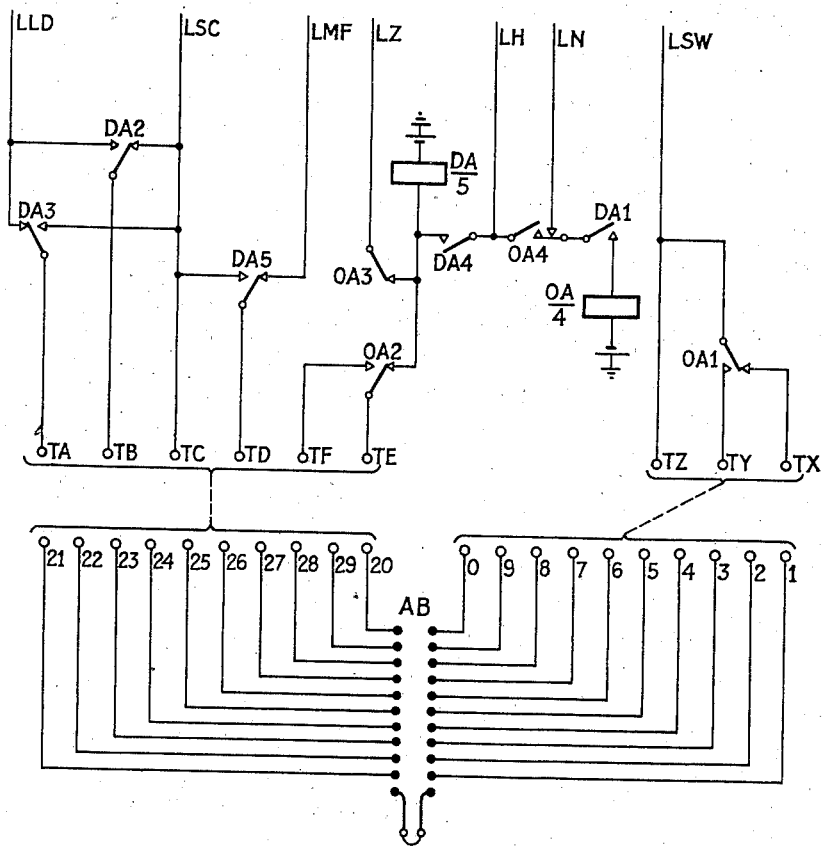

Figs. 1 and 2 show the circuit of the selector repeater portion of a D. S. R. while Figs. 3 and 4 show circuits of the discriminating relay portions adapted respectively to absorb the first and second digits and discriminate on the first, second and third, and to absorb the first digit and to discriminate on the first and second digits. Either set of discriminating relays can be associated with the selector repeater portion according to the requirements of the network concerned. The selector mechanism is assumed to be of the two-magnet vertical and rotary type such as is disclosed in Patent No. 2,028,689 granted January 21, 1936, to Saxby.

Figure 5:
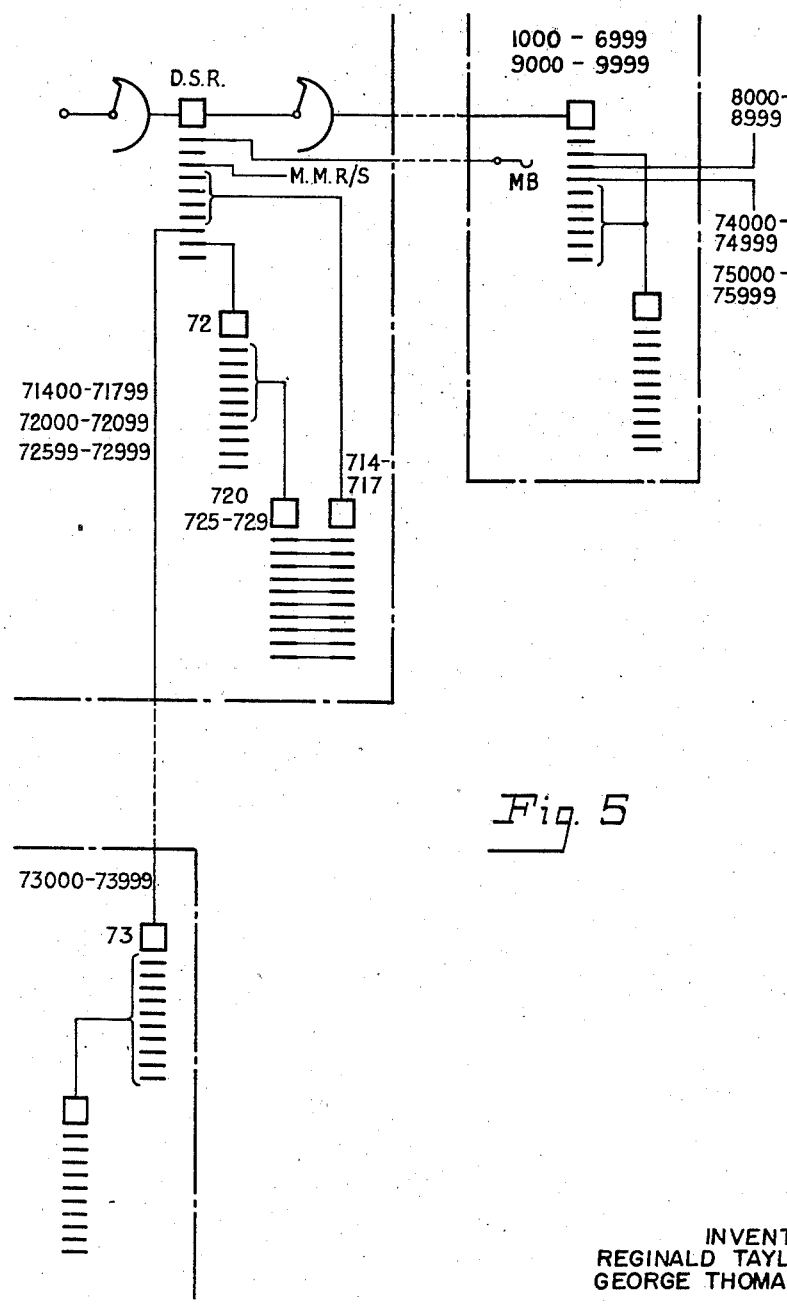

Fig. 5 shows a trunking diagram of a typical satellite exchange area. The numbering scheme for this area involves absorption of first and second digits and discrimination on first, second and third digits, hence the discriminating relays of Fig. 3 will require to be used on the D. S. R. The precise numbering arrangements which are taken by way of example are catered for by the particular cross-connections shown between the discriminating relays and the selector vertical bank.

Fig. 6 tabulates the absorbing and discriminating facilities required on the first, second and third digits of numbers in the above-mentioned scheme.

Fig. 7 tabulates the various facilities which are available on first, second and third digits from the various cross-connection terminals TA—TK and TT—TZ of Fig. 3, an asterisk indicating that the available facility can be decided at will. Fig. 8 is a similar table for use with the discriminating relays of Fig. 4.

Certain of the calls from a satellite exchange in the area which are routed via the main exchange are multi-fee calls, that is to say, they may require single or multiple meter fees according to the location of the wanted exchange with respect to the calling exchange. The fee determination on such calls is effected by multi-metering equipments which are located in common groups accessible via a particular level of the satellite exchange D. S. R.'s, and comprising digit storing uniselectors by means of which the appropriate fees for giving dialled numbers can be ascertained.

Referring now to Figs. 1 and 2 and considering the circuit operation, on the seizure of the D. S. R. by a calling satellite exchange subscriber either via a line finder or by his uniselector, relay A is operated over the loop and operates relay B by way of contacts N3, MD3 and A1. Relay JG is also operated by way of contacts N3, MD3, A1 and N4. Relay B thereupon earths the P conductor at contacts B1, completes a locking circuit for itself and relay JG at contacts B5, and at contacts B6 lights the supervisory lamp LP, the circuit of which extends to battery over lead 15 by way of a delayed alarm. Relay JG at contacts JG1 energises relay MD, at contacts JG2 prepares the circuit of the vertical magnet VM, at contacts JG3 connects the junction hunter magnet JHM to the test wiper JH4 of the junction hunter, at contacts JG5 prepares for the connection of dial tone to the calling party by way of the left-hand winding of relay I, at contacts JG6 prepares a locking circuit for itself and at contacts JG7 opens the connection between the last contact in the bank JH4 and lead 14 which extends to an overflow meter. Relay MD operates at this time and prepares a locking circuit for itself at contacts MD1, at contacts MD2 prepares the release circuit of the D. S. R., at contacts MD3 prepares a circuit for relay C which is at present short-circuited, at contacts MD4 connects an additional earth to the P conductor, at contacts MD5 connects earth to the left-hand terminal of relay K and at contacts MD6 prepares an impulsing circuit over the positive wiper of the D. S. R.

The junction hunter switch follows usual practice in that, although it is of the homing type, the wipers are normally resting on the first junction of the group. The twenty-fifth position of the bank does not connect with any junction however, this position being set aside for returning a busy tone to the calling party in case all junctions should be engaged; hence twenty-four outlets, which may be graded, are available to the junction hunter wipers.

On the connection of the switch magnet JHM to the test wiper JH4, the switch commences hunting to find a free junction. When this is encountered, relay K is no longer short-circuited by earth picked up by wiper JH4 and energises in series with the magnet which cannot now operate. Relay K thereupon at contacts K1 completes the dial tone circuit, at contacts K2 completes a locking circuit for itself, at contacts K3 earths the test wiper to busy the seized outlet, at contacts K4 opens a point in the homing circuit of the switch, at contacts K5 and K6 loops relays D and I across the outgoing junction, at contacts K7 opens a point in one circuit for relay SC and at contacts K8 opens a point in the circuit of the D. S. R. rotary magnet RM which circuit extends to earth over lead 16 by way of delayed alarm equipment. Relay I now operates and completes the locking circuit of relay MD while relay D which is polarised by the rectifiers MRB and MRC is unable to operate under these conditions.

In case all the junctions of the group are busy, the switch wipers are brought to rest in the last position owing to the absence of earth on the 25th contact and relay K operates as before. Dial tone is now returned to the calling party in order to enable local or other non-junction calls to be completed and busy tone is substituted later if the call proves to be for the main exchange.

The calling party now dials the first digit and relay A follows the impulses in well-known manner. Each time it releases, a circuit is completed for the vertical magnet from earth by way of contacts B5, A1 and JG2. Relay B is intermittently short-circuited during the train of impulses but not for sufficiently long to cause its release. Magnet VM receives a corresponding number of impulses and the switch wipers are raised to the desired level. At the same time impulses are repeated at contacts A2 over the junction to the main exchange to operate the distant incoming selector. On the first release of relay A, relay C is no longer short-circuited and operates. Thereupon at contacts C1 it energises relay CR and at contacts C2 closes a circuit in series with contacts B2 for short-circuiting relays D and I in order to give a low impedance impulse-repeating loop. Relay CR at contacts CR1 closes another point in the alternative circuit for relay SC, at contacts CR2 prepares a circuit which will be effective subsequently for reintroducing relays D and I into the outgoing loop in two stages, at contacts CR3 energises relay J, at contacts CR4 closes a further holding circuit for relay K, at contacts CR5 prepares for the connection of earth over lead LSW and at contacts CR6 closes an additional holding circuit for relay JG. Relay J at contacts J1 prepares the metering circuit, at contacts J2 disconnects dial tone, at contacts J3 prepares a locking circuit for itself, at contacts J4 prepares a locking circuit for relay RS and at contacts J5 disconnects the supervisory lamp LP and closes a multiple locking circuit for relay MD.

On the first vertical step of the switch the off-normal contacts are operated and at contacts N4 the initial circuit for relay JG is opened and it remains held over its right-hand winding and contacts JG6. Relay C is also intermittently short-circuited during the train of impulses but remains held until the end of the train. Relay C then releases and opens the circuit of relay CR but the latter relay is slow to release due to its slug and while it holds up, earth is connected to conductor LSW. Meanwhile at the end of the first impulse train the main exchange incoming selector will proceed to cut into the level dialled and to hunt in the rotary direction for either a subsequent selector in the main exchange or an outgoing auto-to-auto relay set giving access to another exchange.

At this point in the description consideration will be given to the network numbering scheme which is assumed to be as follows:

Routed to manual board via D. S. R. Level 0 ____ 0
Routed to Main Single Fee _____ { 1000–6999
                                      { 9000–9999
Routed through Main Multi-fee _____ 8000–8999
Routed through Main to other  { 74000–74999
  satellites _____ { 75000–75999
                                { 71400–71799
Local numbers _____ { 72000–72099
                                { 72599–72999
Routed to adjacent satellite via
  D. S. R. Level 3 _____ 73000–73999

If the first digit of a single fee main exchange number such as 1–6 or 9 is dialled, the application of earth to signalling lead LSW will be without effect on the associated discriminating relays and no return earth potential will be extended back from these relays to any of the other signalling leads, a main exchange call being characterised by the absence of any return earth potential.

In this case therefore no further operation will occur until relay CR releases whereupon the holding circuit for relay JG is opened. Relay JG on releasing disconnects the circuit for the vertical magnet at contacts JG2, and at contacts JG5 connects up a busy tone circuit so that if the junction hunter JH has been driven to the twenty-fifth position, busy tone over lead 13 is applied to the left-hand winding of relay I and is transmitted by induction to the calling subscriber. In this case since there is no circuit for relay I, relays MD and J now release in turn and relays A, B and K fall away when the calling party hangs up.

Assuming however that a main exchange junction has been seized, relays A, B, MD and J remain energised and subsequent digits produce corresponding operation of relay A which at contacts A2 repeats the digits to the main exchange to set up the selectors therein to effect connection with the wanted main exchange party. When the called subscriber answers, relay D operates owing to the reversal of current flow over the loop and at contacts D1 prepares a circuit which will not be effective in the present instance and at contacts D2 releases relay MD. Relay MD opens the circuit for relay J and during the slow release period of this latter relay earth is applied to the meter lead M by way of contacts MD5, J1, RS2 and MD6. Relay MD also at contacts MD2 prepares the restoring circuit for the rotary magnet RM of the D. S. R.

When the calling party hangs up at the end of the conversation, relay A releases and at contacts A1 short-circuits relay B for sufficiently long to cause its release while at contacts A2 it opens the outgoing loop so as to initiate release of the main exchange selector train. During the release of relay B, relay C operates and again brings up relay CR which at contacts CR4 maintains an alternative holding earth on the incoming P conductor and for relay K. After the release of relay B, relays C and CR commence to release slowly in turn and when relay CR falls away the circuit for relay K is opened whereupon a homing circuit is completed for the junction hunter over contacts K4. At contacts K3 guarding earth is removed from the junction hunter test wiper, the usual junction guarding relays serving to ensure that the junction remains guarded for a further period sufficient to cover the release of the main exchange switches. At contacts K2 guarding earth is reapplied to the incoming P conductor by way of contacts N2, K2, LD6 and SC4 until the D. S. R. has released, while at contacts K8 a self-interrupting circuit is completed for the rotary magnet RM. The wipers are accordingly rotated clear of the banks after which they fall and rotate back under the banks by spring tension to their normal position where the off-normal contacts are restored. At contacts N1 the circuit of the rotary magnet is then opened while contacts N2 remove the guarding earth from the incoming P conductor and the equipment is then completely restored to normal.

If the call has been to an operator in the main exchange, metering will not normally be effected, that is to say there will be no reversal to operate relay D, but instead battery will be connected to the positive conductor to give an operator hold facility. This produces no effect until the calling party hangs up whereupon relays A and B release in turn and relays C and CR are momentarily operated. On the release of relay B, the circuit of relay J is opened and a circuit is completed for relay I to the battery connection at the operator's position. Relay I maintains relay MD which prevents the release of the D. S. R. until the operator takes down the connection. When this occurs, relays I, MD and K release, the junction hunter JH homes and earth is removed from the P lead at contacts MD4.

Assuming now that the first digit dialled is 7, in every case absorption will be required at the satellite exchange. The operations which take place responsive to the seizure of the D. S. R. are the same as previously described up to the end of the first impulse train, at which time relays A, B, JG, MD, J and K are operated, relay C has just released and relay CR is being held by its slug. In this case since the digit dialled is 7, the application of earth to lead LSW will result in the operation of relay DA if the discriminating relay group is connected as shown in Fig. 3. The various possibilities of this scheme of connections will be dealt with in detail later and at this time it will merely be pointed out that the operation of relay DA results in the connection of earth to lead LH and also to lead LZ. The earth on lead LH serves to maintain relay JG over its right-hand winding while the earth on lead LZ is extended over contacts MD2, H4, RMC and N1 to rotary magnet RM to restore the D. S. R. to normal. If this operation is not completed by the time relay CR releases, relay JG is held up over lead LZ from earth supplied to lead LH by way of contacts B5 and JG6. When the switch is completely restored, off-normal contacts N4 again close thereby applying earth to lead LN whence it is extended to operate relay OA. Earth is then removed from lead LZ but relay JG is now maintained by its left-hand winding over its original energising circuit so that earth is maintained on lead LH to keep relay DA locked up.

If the second digit dialled is 3, which with the assumed numbering scheme denotes a call to the adjacent satellite exchange, the D. S. R. wipers are raised to the third level and earth is then applied to lead LSW during the release time of relay CR. With the conditions now prevailing in the discriminating relay group, Fig. 3, this earth extends to lead LLD and effects the operation of relay LD. This relay at contacts LD1 energises relays RS and H, at contacts LD2 and LD3 connects up the line wipers of the D. S. R., at contacts LD4 prepares the metering circuit, at contacts LD5 opens the loop over the junction in order to release the main exchange switches and at contacts LD6 completes a locking circuit for itself and renders relay K dependent upon relay CR so that when this latter relay finally releases, relay K also releases and a circuit is completed for homing the junction hunter when relay JG releases in consequence of its circuit being opened on the release of relay CR. Relay JG as before opens the impulsing circuit for the vertical magnet. Relay RS at contacts RS1 completes a locking circuit for itself dependent upon relay J, at contacts RS3 prepares a circuit for relay SC, at contacts RS4 completes a circuit for the upper winding of relay H, at contacts RS5 prepares an alternative circuit for the lower winding of relay H, at contacts RS6 closes a point in the metering circuit which will not be effective in the present case and at contacts RS7 opens a point in the release circuit for the D. S. R. Relay H at contacts H1 and H3 disconnects the line wipers of the D. S. R. to prevent interference during the hunting operation at contacts H2 connects its own lower winding to the test wiper P and at contacts H4 completes a self-interrupting circuit for the rotary magnet RM from earth over contacts LD1. The switch therefore now commences to hunt over the selected third level and it will be seen that at each operation of the magnet the interrupter springs RMC are opened and hence the circuit for the upper winding of relay H is interrupted. If busy lines are encountered however, the test wiper picks up earth to maintain relay H by way of its lower winding. The initial circuit for this winding is opened at contacts NR1 on the first rotary step of the switch. Accordingly the switch continues to step until a free line is encountered or the wipers are driven to the eleventh position. In the latter event the cam springs are operated and at contacts S1 an overflow meter is operated by way of lead 17, at contacts S2 busy tone from common lead 11 is sent back to the calling party and at contacts S3 relay SC is operated. The calling party is thus advised that he cannot obtain his connection and when he hangs up, release takes place in the manner previously described.

If a free outlet is found, the test wiper fails to encounter earth and relay H releases quickly when the interrupter contacts open, thereupon maintaining the circuit of magnet RM open at contacts H4 and applying guarding earth to the P wiper over contacts H2. The repeater element is now connected to an incoming third selector at the adjacent satellite exchange, the D. S. R. having functioned as a second selector.

When the remaining digits of the required number are received, relay A again responds and serves merely to repeat these digits to the adjacent satellite exchange selectors to effect connection with the wanted party therein. When this party replies, relay D is operated in the usual manner and releases relay MD so that during the slow release time of relay J, a metering impulse is transmitted over conductor M by way of contacts MD5, J1 and LD4. During the conversation, relays A, B, LD, RS, I and D remain operated in the D. S. R.

When the called party hangs up relay D releases and at contact D2 lights the lamp LP to give called subscriber hold supervision. When the calling party hangs up, relay A releases and short-circuits relay B which thus falls away after its slow period. Thereupon at contacts B1 it removes earth from the P conductor and also opens the holding circuit for relay LD which thereupon releases. Relays C and CR were also momentarily operated as previously described but without useful effect. The release of relay RS on the release of relay LD completes a circuit at contacts RS7 for restoring the switch to normal whereupon contacts N2 open to remove the guarding earth from the P conductor and the equipment is then ready for seizure for another connection.

Similar remarks apply as regards the local numbers commencing with the digits 72 in which case the first digit is absorbed and the second digit steps the D. S. R. to level 2 after which it hunts for a free local third selector. Further dialled digits effect the setting of additional switches in the satellite exchange.

If the first two digits dialled are 71, this indicates local numbers requiring both first and second digit absorption. In this case the first digit 7 will be received as just described and relays A, B, JG and MD will remain operated at the end of the train while the discriminating relay group of Fig. 3, relays DA and OA will be operated. In response to the second digit 1, the switch wipers will be raised to the first level and earth will be applied to lead LSW during the slow release time of relay CR. In these circumstances a circuit is completed for relay DB which locks up to lead LH and the operating earth is also extended over lead LZ to restore the D. S. R. to normal. In these circumstances relay JG is held as before over its lower winding and owing to the connection of earth to lead LN when off-normal contacts N4 again close, relay OB in Fig. 3 is operated and also locks up to lead LH. If a local call is being completed, the third digit will be 4, 5, 6 or 7 and the D. S. R. will step correspondingly. In any of these cases the effect will be that the earth on the lead LSW is extended to lead LLD to operate relay LD with the results previously described.

In case the first two digits dialled are 74 or 75, the first digit 7 will be absorbed in the usual manner leaving relays A, B, JG, MD, I and J operated. In response to the dialling of the second digit 4 or 5 which characterises a main exchange call, it will be seen from Fig. 3 that the application of earth to lead LSW is without effect. Consequently when relay CR releases, the holding circuit for relay JG is opened and it also releases so that no further operation of magnet VM is possible and the call is set up over the main exchange.

In response to the dialling of a first digit 0 characteristic of a call to the main exchange manual board, the earth from lead LSW is extended over the equipment of Fig. 3 to lead LLD to operate relay LD. Consequently the D. S. R. now hunts over the tenth level from which extend high grade trunks to the main exchange manual board. In this case the initial connection extending over the junction hunter to the trunks normally used is released.

Considering now the case in which the first digit dialled is 8, this characterises a multi-fee call which is routed through the main exchange. In response to the dialling of this digit, the wipers of the D. S. R. are raised to level 8 and earth is applied to lead LSW in the usual manner. This earth extends through the relay set of Fig. 3 and by way of terminal TE and contacts DA3 to lead LMF and accordingly effects the operation of relays H and RS. These relays produce the results previously described so that the switch cuts in and hunts over the 8th level in search of a free multi-metering fee determining equipment connected to an outlet on this level. The hunting operation takes place as previously described and when a free outlet is reached, relay H releases to stop the hunting operation at contacts H4. Since relay LD is not operated in this instance, however, the connection to the main exchange is maintained and also at contacts H1 the negative wiper of the D. S. R. is connected to the upper winding of the spare code relay SC while at contacts H3 the positive wiper is connected to the impulsing contacts of relay A by way of contacts LD2, RS2, MD6 and JG2.

Further impulses dialled are repeated by contacts A2 to the main exchange to set the switches therein and are also repeated by contacts A1 over the positive wiper of the D. S. R. to operate the multi-metering equipment which has been taken into use. When the connection has been fully set up and the wanted party replies, relay D is operated in the usual manner to release relay MD at contacts D2, while at contacts D1 the connection of battery through the winding of relay SC to the negative wiper of the D. S. R. is shortly replaced by earth over contacts MD5 to signal to the multi-metering equipment that the D. S. R. is awaiting reception of the appropriate meter pulse. The release of contacts MD6 connects the positive wiper of the D. S. R. to the metering lead M and the pulses then sent back from the multi-metering equipment thus effect suitable operation of the calling party's meter. During the sending out of the metering pulses, the multi-metering equipment connects earth to the P lead to maintain relay RS after the release of relay J which is de-energised by relay MD. This earth is removed when impulse transmission is completed whereupon relay RS releases and the multi-metering equipment is freed for further use. The D. S. R. is restored to normal when relay K releases at the end of the conversation.

If a spare code is dialled into the multi-metering equipment, it is arranged that earth is applied to the negative lead and this operates relay SC over its upper winding. This relay thereupon locks up over its lower winding at contacts SC4, at contacts SC2 connects number unobtainable tone from lead 12 to the left-hand winding of relay I whence it is transmitted to the calling party, at contacts SC3 releases relay J whereupon relay RS is released and the multi-metering equipment is freed, and at contacts SC1 opens the loop to the main exchange so that the operated switches therein are restored. The opening of the outgoing loop releases relay I which brings down relay MD and owing to the operation of relay SC, relay MD releases relay K. The wipers of the D. S. R. are then restored to normal but relays A, B and SC remain operated until the calling party hangs up.

Relay SC will also be operated if the calling party dials while the switch JH is still hunting for a junction to the main exchange. In this case relay K is not operated and on the operation of relay CR a circuit is completed for relay SC from earth by way of contacts B1, RS3, CR1 and K1. Relay SC then transmits N. U. tone to the subscriber and prevents the setting up of a call to a wrong number owing to the mutilation of the first train of impulses.

Considering now the general operation of the discriminating relays of Fig. 3, with the proposed numbering scheme the following discrimination and absorption facilities after first, second and third digits are required as indicated in briefer form in Fig. 6.

| First Digit | First Digit 7 Second Digit | First Digit 7 Second Digit 1 Third Digit |
|---|---|---|
| 0—As local (L) | 0—Spare Code (SC) | 0—Spare Code (SC) |
| 1—Main (M) | 1—Absorb (A) | 1—Spare Code |
| 2—Main | 2—Local (L) | 2—Spare Code |
| 3—Main | 3—As local (L) | 3—Spare Code |
| 4—Main | 4—Main (M) | 4—Local (L) |
| 5—Main | 5—Main | 5—Local |
| 6—Main | 6—Spare Code (SC) | 6—Local |
| 7—Absorb (A) | 7—Spare Code | 7—Local |
| 8—Multi Fee Main (MF) | 8—Spare Code | 8—Spare Code (SC) |
| 9—Main (M) | 9—Spare Code | 9—Spare Code |

The facilities available from the various cross-connection terminals TA—TK and TT—TZ in response to first, second and third digits are tabulated in Fig. 7.

Considering now the dialling of a main exchange characteristic first digit 1, the earth applied to lead LSW will extend via terminal TZ, vertical bank terminal 1, vertical wiper and terminal 21 to terminal TG whence it extends to terminal TJ which is unwired in the present example. Hence no earth will be returned to the selector over any of the signalling leads and relay JG will release at the end of the digit so as to initiate main exchange call conditions as already described.

Similarly in response to the dialling of any one of the first digits 2-6 or 9, no earth will be returned to the selector as will be evident from examination of each of the vertical wiper positions concerned.

If the first digit dialled is 7, earth on lead LSW will bring up relay DA via terminals TZ and TF, and at the same time will extend via these terminals to lead LZ. Relay DA in operating locks to lead LH (earthed from the selector), maintains earth from lead LH on lead IZ, prepares for the reception of a second digit and prepares a circuit for relay OA. The earth on lead LZ initiates release of the selector and when this has taken place earth is applied from the selector to lead LN so as to bring up relay OA which locks to lead LH, disconnects the earth to lead LZ and prepares for the second digit.

If the second digit dialled is 3, on the re-application of earth to lead LSW this will extend via terminals TX and TA to lead LLD so as to cause the selector to switch over and function as a second selector and so to hunt for a subsequent switch. Similar remarks apply if the second digit dialled is 2.

If the second digit dialled is 1, the earth on lead LSW will be extended via terminals TZ and TG to bring up relay DB and at the same time it will be fed back over lead LZ so as again to release the selector. Relay DB in operating locks and maintains earth on lead LZ, prepares for the reception of the third digit and prepares a circuit for relay OB which operates when the selector restores to normal.

In response to the dialling of a third digit 4–7, the earth on lead LSW will be extended back to lead LLD so as to effect discrimination in favour of a local connection.

In case the first two digits dialled are 74 or 75, the selector will absorb the first digit as described, relays DA and OA being operated, while in response to the second digit 4 or 5, the earth on lead LSW is without further effect either on the discriminating relays or as regards feeding back to the selector so that discrimination in favour of a junction call is effected.

In response to the dialling of the first digit 0, the earth on lead LSW extends via terminals TZ and TB to lead LLD so as to give local discrimination.

In case the first digit dialled is 8, the earth on lead LSW extends via terminals TZ and TE to lead LMF so as to cause the selector to cut in and hunt for a multi-fee metering equipment in the manner already described.

From the above remarks it will be seen that of the digits which produce actuation of the selector, all the single digits 1–0 have been accounted for, but as regards the double digits, digits 70, 76, 77, 78 and 79 have yet to be dealt with. These digits are not provided for in the numbering scheme and therefore form part of spare code numbers. In the event of their being dialled, the first digit 7 is absorbed in usual manner, while the second digit 0 or 6–9 results in the extension of earth from lead LSW on to lead LSC as a result of which relay SC is operated in the selector and provides the number unobtainable tone conditions already described. Similar remarks apply as regards spare code digits 710–713 and 718 and 719.

In other cases where dialled spare code digits result in actuation of other selectors either at the satellite or other exchanges, the selector levels concerned will be utilised in known manner to enable number unobtainable tone to be returned from the first rotary step position.

It will thus be seen that in regard to any dialled spare code digits which produce actuation of the selector portion of the D. S. R., the determination of number unobtainable tone conditions is effected by the discriminating relays. This avoids the appropriation of valuable D. S. R. levels which would otherwise be necessary to enable full discrimination of the above-mentioned spare code digits to be provided.

With regard to the multi-fee characteristic digit 8, it will be appreciated that in other numbering schemes two digits such as say 76 may have to be dialled before a multi-fee call can be characterised, the first digit 7 in this instance being absorbed by the D. S. R.

The strapping connections of Fig. 3 may be altered to suit digit discrimination requirements of any numbering scheme where absorption of first and second and discrimination on first, second and third digits is required.

Similar remarks apply as regards the discriminating relays of Fig. 4 which give the D. S. R. facilities for absorbing the first digit and for discriminating on the first and second digits. In this connection the various facilities which are available from the cross-connection terminals TA—TE and TX—TZ are tabulated in Fig. 8.

We claim:

1. In a telephone system, a satellite exchange, a selector repeater including a two motion switch in said exchange, and local lines and metering equipments accessible to said switch, a main exchange line, a calling line connected to said repeater, said repeater operated to seize said main exchange line and operated in response to impulses received over said calling line to repeat them over said main exchange line and to operate said two motion switch, and discriminating means controlled by the primary movement of said switch for causing it to associate an idle metering equipment with said calling line when the main exchange line is desired or to extend the calling line over an idle one of said local lines and release the main exchange line.

2. A telephone system as claimed in claim 1 wherein said discriminating means is arranged to cause a distinctive signal to be transmitted over said calling line and to release a partially set up connection when an unassigned number is dialled.

3. A telephone system as claimed in claim 1 wherein said metering lines include two conductors, means in said repeater operated to repeat impulses, received over the calling line subsequent to the association of a metering line with said switch, over one of said conductors and to transmit metering impulses returned over the other conductor to a metering lead associated with the calling line.

4. In a telephone system wherein both single-fee and multi-fee calls are extended over an automatic switch train under the control of a calling line, a selector repeater in the train having access to a trunk line, local lines and multi-fee metering equipments, said repeater operated to seize said trunk line responsive to seizure over said calling line and operated in response to impulses received over the calling line to repeat them over the trunk line and to select a group of local lines or multi-fee metering equipments, and discriminating means included in said repeater operated to cause an idle one of the multi-fee metering equipments to be associated with the calling line when the received impulses indicate a multi-fee trunk call, to cause the calling line to be extended to an idle one of the local lines in the selected group and the trunk line to be released when the received impulses indicate a local call, and to prevent the association of either a multi-fee metering equipment or local line with the calling line when the received impulses indicate a trunk call other than multi-fee.

5. A telephone system as claimed in claim 4 wherein said selector repeater includes a two motion switch by means of which access to the multi-fee metering equipments and local lines is obtained.

6. A telephone system as claimed in claim 4 wherein said selector repeater includes a two motion switch by means of which access to the multi-fee metering equipments and local lines is obtained, means operated in accordance with the extent of the primary movement of said switch in response to received impulses for controlling said discriminating means, said discriminating means operated to release said switch when impulses representing particular digit values of particular digit orders are received.

7. In a telephone system wherein both local and trunk calls are extended over an automatic switch train under the control of a calling line, a selector repeater in the train having access to a trunk line, local lines, and multi-fee metering equipments, said repeater operated responsive to seizure by said calling line to seize said trunk line and operated in response to impulses received over the calling line to repeat them over the trunk line and to select a group of local lines or multi-fee metering equipments, and discriminating means included in said repeater operated to cause an idle one of the multi-fee metering equipments to be associated with the calling line when the received impulses indicate a trunk call and to cause the calling line to be extended to an idle one of the local lines in the selected group and the trunk line to be released when the received impulses indicate a local call.

8. In a telephone system wherein both single-fee and multi-fee calls are extended over an automatic switch train under the control of a calling line, a discriminating selector in the train comprising a two motion switch having a wiper operated on the primary movement thereof in response to the initial series of impulses representing digits transmitted over the calling line, said switch having access to multi-fee metering equipment, a relay group, and a cross-connecting frame for connecting said relay group to said selector through said wiper so as to operate the relay group in accordance with the setting of the wiper in response to received impulses to either release the switch on a single-fee call or to initiate the automatic secondary movement thereof so as to associate an idle multi-fee metering equipment with the calling line on a multi-fee call.

9. In a telephone system, a discriminating selector comprising a two motion switch having a wiper operated on the primary movement thereof in response to series of impulses representing digits transmitted over a calling line connected thereto, a relay group comprising a pair of relays for each digit order which may be absorbed, and a cross connecting frame for connecting said relay group to said switch through said wiper so as to operate the relay group in accordance with the setting of the wiper in response to received impulses to either release the switch or initiate the automatic secondary movement thereof, one relay of said pair operated only in response to the dialling of particular digits of the corresponding order to release said switch, and the other relay of the pair operated in response to the restoration of the switch.

REGINALD TAYLOR.
GEORGE THOMAS BAKER.

REFERENCES CITED

The following references are of record in the file of this patent:

UNITED STATES PATENTS

| Number | Name | Date |
| --- | --- | --- |
| 1,805,778 | Mercer | May 19, 1931 |
| 2,029,018 | Cruickshork | Jan. 28, 1936 |
| 2,036,055 | Koechling | Mar. 31, 1936 |
| 2,165,924 | Goodrum | July 11, 1939 |
| 2,232,189 | Taylor et al. | Feb. 18, 1941 |
| 2,373,908 | Ostline | Apr. 17, 1945 |